United States Patent [19]
Ferrand et al.

[11] Patent Number: 6,129,184
[45] Date of Patent: Oct. 10, 2000

[54] VARIABLE TORQUE BRAKING DEVICE

[75] Inventors: Gilles Ferrand, Saint Barthelemy; Eric Tranchand, Grecy-Couve, both of France

[73] Assignee: Dana Corporation, Toledo, Ohio

[21] Appl. No.: 08/957,651

[22] Filed: Oct. 24, 1997

[51] Int. Cl.[7] .................................................. F16D 65/24
[52] U.S. Cl. ...................... 188/170; 188/171; 188/106 F; 187/223
[58] Field of Search .................................... 188/158, 171, 188/173, 106 P, 106 F, 170; 187/223, 222; 303/9.69

[56] References Cited

U.S. PATENT DOCUMENTS

| | | | |
|---|---|---|---|
| 4,134,478 | 1/1979 | Balzer | 188/170 |
| 4,263,991 | 4/1981 | Morgan et al. | 188/170 |
| 4,560,034 | 12/1985 | Windish et al. | 188/170 |
| 4,930,975 | 6/1990 | Ito | 414/635 |
| 5,368,138 | 11/1994 | Kuivamaki | 188/171 |
| 5,480,216 | 1/1996 | Matsunaga | 303/9.69 |

FOREIGN PATENT DOCUMENTS

| | | |
|---|---|---|
| 0446 421 A1 | 9/1991 | European Pat. Off. . |
| 28 20 204 A1 | 1/1979 | Germany . |
| 36 27 788 A1 | 2/1988 | Germany . |

OTHER PUBLICATIONS

Preliminary Search Report, National Institute of Industrial Property, France, Jul. 7, 1997.

*Primary Examiner*—Robert J. Oberleitner
*Assistant Examiner*—Mariano Sy
*Attorney, Agent, or Firm*—Dykema Gossett PLLC

[57] ABSTRACT

The present invention concerns a variable-torque braking device. The device is characterized in that it includes a secondary control (14, 17) which allows exertion on a friction-lining pad (9) of an additional moving-system braking torque as a function of a variable command parameter which exerts on the friction-lining pad (9) a movable-system braking force or torque capable of linear variation, in addition to the constant braking torque or force furnished by a main control, as a function of the variable control parameter. The invention finds an application notably to braking forklifts.

10 Claims, 2 Drawing Sheets

VARIABLE TORQUE BRAKING DEVICE

BACKGROUND OF THE INVENTION

The present invention concerns a variable-torque braking device.

The invention applies in a nonlimiting manner to a forklift with two lifting forks designed to lift and carry variable loads.

In such an application, the known braking device is designed to exert a constant or fixed predetermined braking torque to each wheel of the forklift.

The known device, however, is not entirely satisfactory. The braking obtained when the forklift's braking torque is set to a fixed value, set or corresponding to the forklift's performance when empty (i.e., in the absence of a load on its two lifting forks) is insufficient, even dangerous, when the forklift is loaded (i.e., when it is carrying a relatively significant load on its two lifting forks).

Moreover, when the braking torque supplied by the known device is established at a fixed value designed for the maximum load authorized for the forklift, braking can turn out to be too sudden for an unloaded or lightly loaded forklift, thereby creating danger as it risks locking the corresponding wheel of the forklift, provoking uncontrolled skidding.

SUMMARY OF THE INVENTION

The objective of the present invention is to eliminate the above-cited problems of known devices by providing a device for braking the movement of a mobile system, including a main control suitable for exerting, on a pad having at least one friction lining, a constant braking force or torque to the mobile system and a secondary control which allows the application, on the friction-lining pad, of an additional braking force or torque to the mobile system, which is a function of a variable control parameter that exerts on the friction-lining pad a braking force or torque to the mobile system capable of varying, based on the constant braking force or torque, as a function of the variable control parameter.

Preferably, the additional force or torque exerted on the friction-lining pad varies proportionally to the above-mentioned control parameter.

Advantageously, the braking device includes a frame parallel to the friction-lining pad, movable axially with respect to a fixed-support housing whose rotation is blocked relative to it, the main control being designed to control the axial movement of the movable frame between two positions: engagement of the frame with the friction-lining pad, for constant-torque braking of the mobile system, and disengagement of the frame from the friction-lining pad; and a piston system housed inside the fixed-support housing, which can be moved axially inside the fixed-support housing by the secondary control, to exert on the frame, which is engaged with the friction-lining pad, an additional axial force which increases in proportion to the displacement effort exerted on the piston system by the secondary control.

According to one realization, the main control includes at least one elastic system, such as a helical spring, placed between the mobile frame and the fixed-support housing, to push the mobile frame into engagement with the friction-lining pad and produce a constant-torque braking of this pad, and an annular electromagnet housed in the fixed-support housing, capable of attracting, when fed, the mobile frame into a position disengaged from the friction-lining pad to counter the drawing force of the elastic system.

According to a second realization, the main control includes an annular electromagnet lodged in the fixed-support housing, and capable, when fed, of pressing the movable frame against the friction-lining pad to produce constant-torque braking on this pad, and at least one elastic system, such as a helical spring, placed between the movable frame and the fixed-support housing to draw the mobile frame back to a position disengaged from the friction-lining pad when the annular electromagnet is not fed.

According to a third realization, the main control includes at least one pressure chamber built into the inside of the fixed-support housing and designed to receive fluid under pressure to press the movable frame against the friction-lining pad, producing the constant-torque braking of this pad, and at least one elastic system, such as a helical spring, placed between the movable frame and the fixed-support housing, to draw the movable frame back to a position disengaged from the friction-lining pad in the absence of fluid under pressure in the pressure chamber.

Preferably, the secondary control includes a pressure chamber placed in the fixed-support housing, connected to the bore of this housing in which the piston system moves, and connected as well to a secondary command circuit which allows the introduction of a fluid under variable pressure into the pressure chamber, constituting the above-mentioned variable control parameter, to push the piston system against the movable frame according to a force proportional to the pressure of the fluid in the pressure chamber.

The device advantageously includes safety features including a second piston system in the fixed-support housing, its front surface limiting the secondary control pressure chamber, and a second elastic system, such as a helical spring, placed between the back of the second piston system and a piece that forms a cover joined to the fixed-support housing in such a way that in the case of a failure of the secondary control circuit, the second elastic system moves the second piston system, which in turn moves the secondary control first piston system to press the movable frame against the friction-lining pad to produce maximum braking torque.

The friction-lining pad is a disk that is rotation-mounted on a brake shaft which is kinetically linked to the wheel of a vehicle and which includes a friction lining on each of its two parallel sides.

Within the framework of applying the device of the invention to a forklift, the lifting forks hydraulic control circuit is linked to the secondary control in such a way that the control oil pressure of this hydraulic circuit constitutes the variable parameter which varies with the load being transported on the lifting forks to obtain an additional braking torque for the forklift proportional to the load being transported.

The invention will be better understood, and other objectives, characteristics, details, and advantages will be seen more clearly in the following explanatory description, which refers to the appended schematic drawings, which are given only by way of example illustrating several modes of realization of the invention, in which:

DETAILED DESCRIPTION OF THE PREFERRED EMBODIMENTS

The variable-torque braking device of the invention will be described as applied to the braking of a forklift with two forks for lifting and transporting variable-weight loads. However, it is to be understood that this device may be applied to braking for all other vehicles and, in general, any system or element whose displacement or movement must be stopped.

Figure 1:
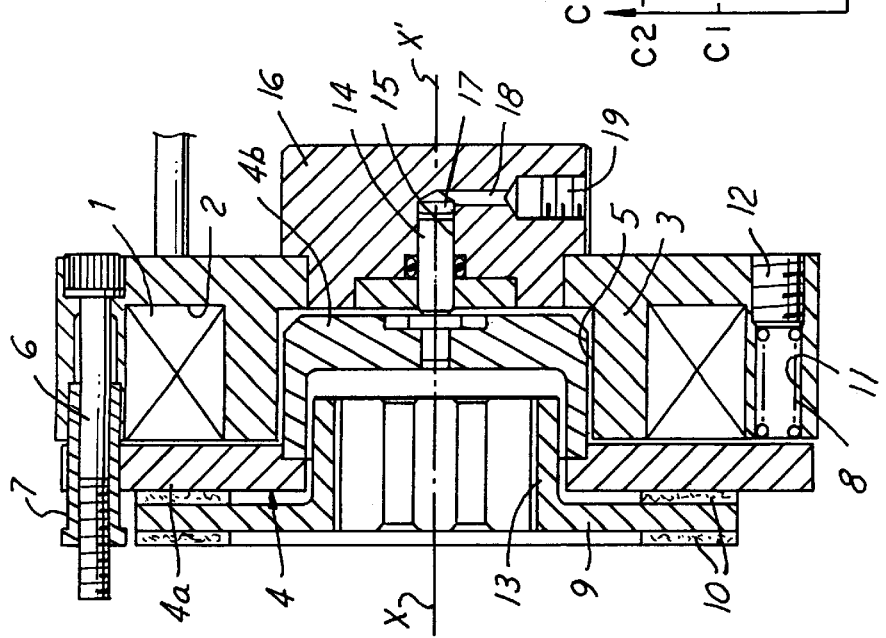
FIG. 1 is a longitudinal section of a variable-torque braking device according to a first realization of the invention.

FIG. 1 represents a first mode of realization of the variable-torque braking device of the invention.

This device includes an electromagnetic main control which includes an annular electromagnet coil 1 housed in an annular cavity 2 realized in a metal fixed-support housing 3 and an axially movable frame 4 made of magnetically conducting material which includes an annular pad 4a perpendicular to longitudinal axis X–X' of the braking device joined to a vertical bottom bowl-shaped piece 4b assembled coaxially to axis X–X' in an annular cavity 5 of larger diameter of the fixed-support housing 3. The rotation of movable frame 4 is blocked with respect to the fixed-support housing 3 by at least one locking screw assembly 6 crossing housing 3 parallel to axis X–X' and a sleeve 7 screwed to the outer threaded part of screw 6 and screwed onto housing 3 through a corresponding bolt hole in the latter, with sleeve 7 passing through a hole in the annular pad 4a to allow it to run along the length of the sleeve 7.

The main braking control of the device also includes at least one elastic system 8, such as a helical spring, and preferably several elastic systems, placed between the annular pad 4a of the movable frame 4 and the fixed-support housing 3, so as to exert a pushing force on the movable frame 4 to press or engage the annular pad 4a with a disk-shaped pad 9 equipped with friction linings 10 affixed to both parallel opposed sides of the friction disk 9. Each spring 8 is housed in a bore 11 parallel to axis X–X', with one of its end coils set against the corresponding face of the annular pad 4a of the movable frame 4 and the opposite end coil resting against the end of a screw 12 set in a corresponding threaded hole in the fixed-support housing 3, which allows regulation of the pushing force of the spring 8 on the movable frame 4.

The friction disk 9 is joined to a fluted hub 13 that is rotation mounted to a rotary braking shaft (not represented) coaxial with axis X–X'. In the forklift application, the braking shaft is linked kinematically to one of its wheels.

The main control described above allows constant braking torque to be exerted on the friction disk 9, obtained by the springs 8 that push the movable frame 4 onto the friction disk 9 when the electromagnet 1 is not fed. When the electromagnet 1 is fed, the movable frame 4 is pulled toward the fixed-support housing 3, that is, toward the right with respect to FIG. 1, counteracting the rebounding force of the springs 8, so as to disengage or declutch the annular pad 4a of the movable frame 4 from the corresponding friction lining 10 on disk 9, thus freeing the disk.

The braking device also includes a secondary control which allows an additional braking torque to be applied to the friction disk 9. The torque is a function of a variable control parameter to be defined later, so as to exert on the friction disk 9 a braking torque that can be varied beyond the constant braking torque obtained by the main control, as a function of the variable control parameter, up to a maximum applied braking torque.

To this end, the secondary control includes a piston system 14 which moves axially within a corresponding bore 15 that is coaxial to axis X–X' and bored into a part 16 joined to fixed-support housing 3. The piston system 14, which is cylindrical, has one of its ends in contact with the outer face of the bottom wall of the bowl-shaped part 4b of the movable frame 4; its other end is continued by a free portion of bore 15, forming pressure chamber 17, which is connected to a pierced channel 18 inside part 16 perpendicular to bore 15 and is continued by a threaded hole 19 that opens up to the outside, and to which a conduit may be connected which forms part of the secondary command circuit and which can in turn be connected to the control circuit, preferably hydraulic (not represented), of the forklift load forks. This hydraulic circuit provides oil under pressure, whose pressure increases with the load carried by the load forks in order to lift the load, and which functions as the variable control parameter mentioned.

The functioning of the above-defined secondary control will now be described also with reference to FIG. 2.

When the forklift is in motion unloaded, that is to say without a load on the lifting forks, the torque applied for braking the forklift by means of friction disk 9 is the constant torque T1 furnished by the main control when the electromagnet 1 is not fed. When a given load is placed on the forklift load forks, the hydraulic fork control circuit furnishes oil under pressure, whose pressure increases correlated with the load being lifted. This oil pressure is likewise furnished to the pressure chamber 17 such that the piston system 14 exerts an additional force on the movable frame 4, preferably proportional to the oil pressure existing in the pressure chamber 17. In other words, when the oil pressure increases in the pressure chamber 17 with the load, the force applied to the frame 4 by the piston system 14 grows in proportion to the pressure variation in this chamber. Thus an additional braking torque is obtained which is proportional to the increase in pressure in the secondary control circuit and which adds to the constant braking torque furnished by the main control, so as to apply to the friction disk 9 a total braking torque fully adapted to braking the forklift under conditions that take into account the load it carries. FIG. 2 shows that by appropriate sizing of the transverse section of the piston system 14, an additional braking torque is obtained that is a linear function of the oil control pressure present in pressure chamber 17, which varies with the load carried by the forklift in such a way that the additional braking torque is proportional to the load.

The forced exerted on the movable frame 4 by the piston system 14 is expressed as follows:

$$Fa=Fr+S\times P$$

where Fa is the force on frame 4;

Fr is the forced exerted on the movable frame 4 by the springs 8;

S is the section of the piston system 14; and

P is the fluid pressure present in the pressure chamber 17.

Figure 3:
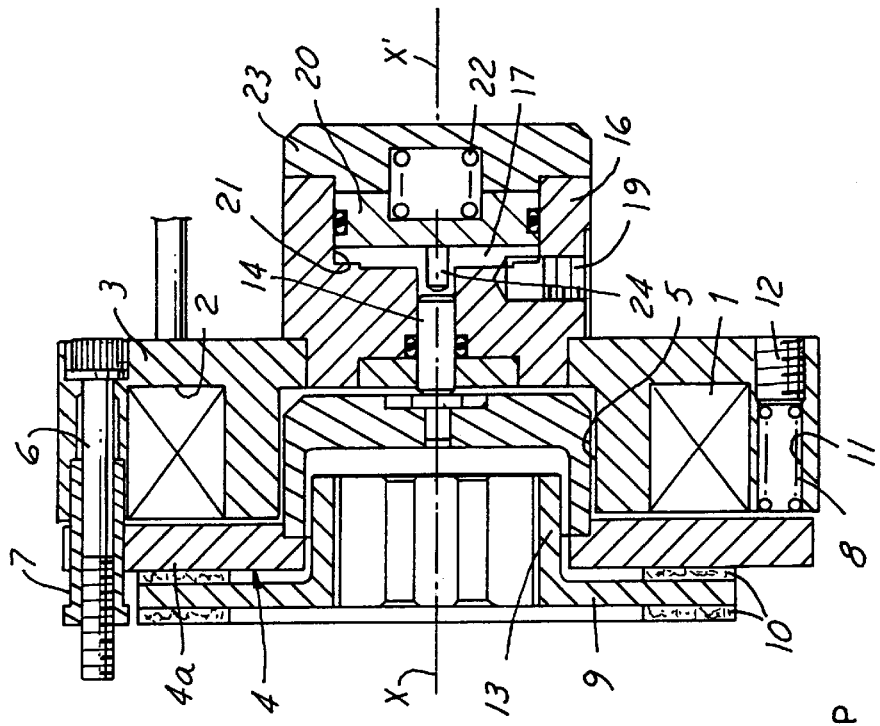
FIG. 3 represents the braking device of FIG. 1 equipped with safety devices.

The braking device according to the second mode of realization of the invention as represented in FIG. 3 differs from that of the first mode of realization in FIG. 1 only in the presence of safety devices in case of failure of the secondary control pressure circuit. Aside from this difference, the elements of the main control and of the secondary control of this second mode of realization common to those of the main control and the secondary control of the first mode of realization and which accomplish the same functions as the latter, have the same references.

According to the device in FIG. 3, the security devices include a second piston system 20 having a larger diameter than that of piston system 14, lodged in a bore 21 joined to the part 16 of the fixed-support housing 3, forming by its front surface the size of the pressure chamber 17 of the secondary control; and a second elastic system 22, such as a helical spring, placed between the rear surface of the piston system 20 and one part serving as a cover 23 joined to part 16, and roughly coaxial with axis X–X' of the braking system. The spring 22 thus tends to act upon piston system 20 (and push it) toward piston system 14. Piston system 20 has an axis 24 joined to the front surface of the latter; its free end can rest against the corresponding free end of piston system 14.

Figure 2:
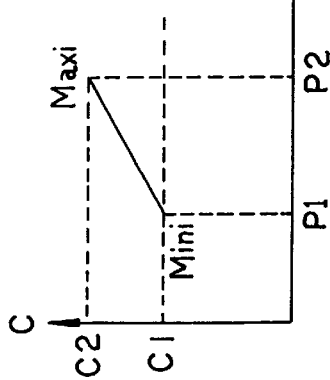
FIG. 2 is a proportion curve between the additional braking torque applied by the device in FIG. 1 and a variable control parameter.

During normal functioning, that is when oil pressure is present in the oil chamber 17 to provide an additional braking torque that is proportional to the load carried by the forklift, piston system 20 is pushed against the cover 23, compressing spring 22 by the pressure in the chamber 17, which can vary linearly from a minimum value to a maximum value as represented in FIG. 2. In case of failure in the pressure circuit that considerably lowers the oil pressure in chamber 17 to nearly zero, the piston system 20 is moved by spring 22 and comes into contact with piston system 14 by means of axis 24, in such a way that the force Fa exerted on the mobile frame 4 to push it against the friction disk 9 is:

$$Fa=Fr1+Fr2$$

where Fr1 is the force exerted by the springs 8 on the movable frame 4; and

Fr2 is the forced exerted by spring 22 on piston system 20.

Figure 4:
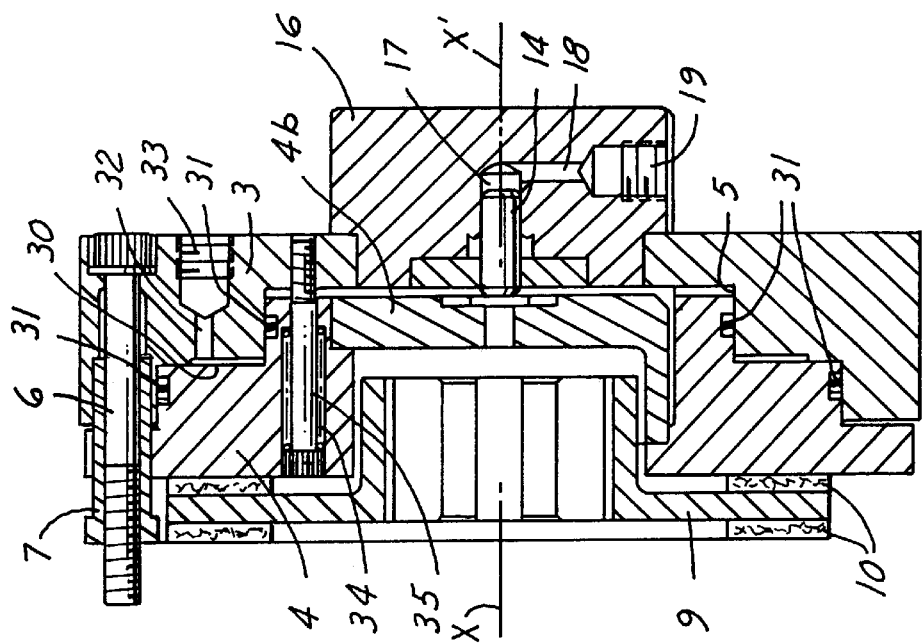
FIG. 4 represents the longitudinal section of a third mode of realization of the variable-torque braking device of the invention.

FIG. 4 represents a third mode of realization of the braking device of the invention in which the main control is of the electromagnetic type as in the modes of realization of FIGS. 1 and 3, but laid out in such a way that the movable frame 4 is pushed against the friction disk 9 when the annular electromagnet 1 is fed and the retracting springs 8 push the movable frame from this disk 9 when the electromagnet no longer has current fed to it.

According to the device in FIG. 4, the annular electromagnet 1 is lodged in the corresponding cavity 2 of the fixed-support housing 3, facing a disk 25 bearing a central hole 26 so that it is placed around part 16, which is joined to housing 3 coaxially to axis X–X'. The disk 25, which is magnetically conducting, is placed opposite pad 4a of the movable frame 4, and is linked to pad 4a by several screws which form push rod 27, of which only one is represented, parallel to axis X–X', each screw 27 having its threaded part 27a engaged in a corresponding threaded hole on the disk 25 and its head 27b resting on the surface of the pad adjacent to the friction disk 9. Each screw 27 joins the mobile disk 25 to the pad 4a of the mobile frame, tightening between them a socket 28 assembled coaxially on screw 27 and running through a corresponding bore in fixed-support housing 3, having its opposite ends resting respectively on the two internal surfaces of the pad 4a and the disk 25. A certain number of springs 29 are placed between fixed-support housing 3 and mobile disk 25. More precisely, each spring 29 is housed in a corresponding bore in housing 3, and one end coil is opposite that resting at the end of the bore on the corresponding surface of movable disk 25.

The functioning of the device of FIG. 4 is as follows.

In order to obtain a constant braking torque using this device, the annular electromagnet 1 is fed current to move disk 25 toward fixed-support housing 3 by magnetic attraction. The movement of the disk 25 causes the concomitant movement in the same direction of the pad 4a on the movable frame 4, so that it pushes it against the friction disk 9. Of course, the movement of the disk 25 toward the housing 3 is carried out against the return force of the springs 29. Stoppage of constant-torque braking by the main control is carried out by discontinuing current to the electromagnet 1, so that the springs 29 push back the disk 25 and thus the movable frame 4, in the direction of disengagement of this frame from the friction disk 9, thus freeing it.

The functioning of the secondary control of the mode of realization in FIG. 4 is identical to that of the secondary controls of the preceding modes of realization, therefore it will not be described again.

Figure 5:
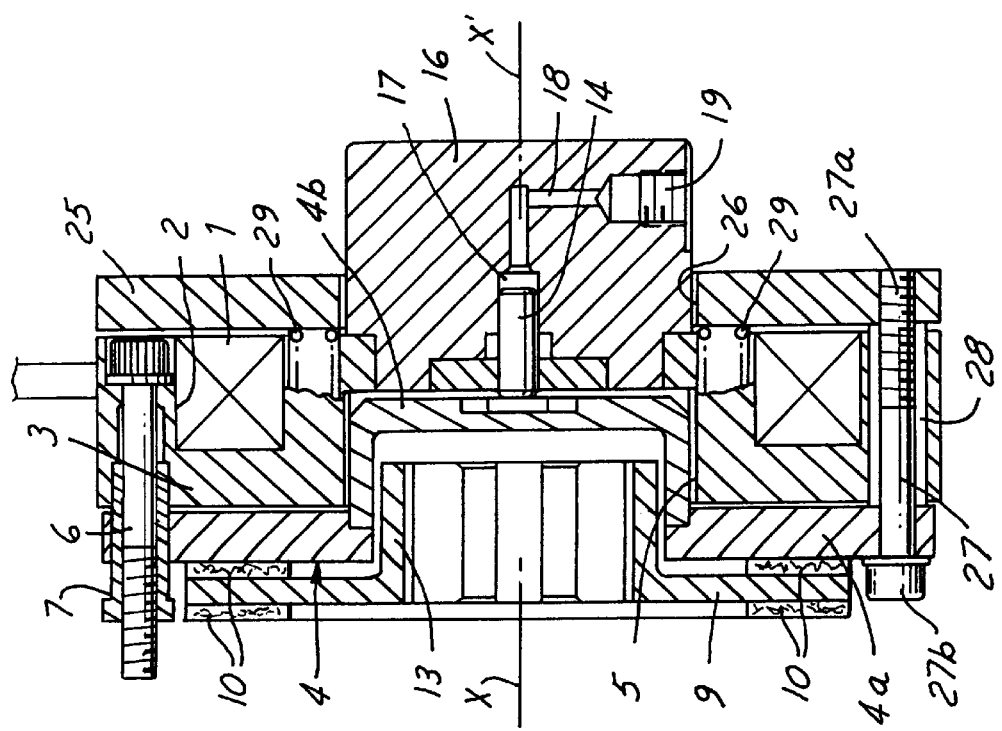
FIG. 5 is a longitudinal section of a fourth mode of realization of the variable-torque braking device of the invention.

FIG. 5 represents a fourth mode of realization of the braking device of the invention, where the main control is of the pneumatic or hydraulic type.

The elements of the main and secondary controls of this mode of realization that accomplish the same functions as those of the previously described modes of realization bear the same reference numbers; only the differences in this mode of realization as compared to the other modes of realization are described below.

According to the device in FIG. 5, its main control includes at least one pressure chamber 30 in the fixed-support housing 3 opposite the movable frame 4, which acts in this case as a piston mounted so that it is movable axially in the fixed-support housing 3. There are water-tight joints 31 between it and the housing 3 in order to prevent all leakage of fluids, pneumatic or hydraulic, present in the pressure chamber 30. The latter is joined to a conduit 32 placed in the housing 3 parallel to axis X–X' and continued by a threaded hole 33 in this housing and opening to the outside. An external conduit (not represented) is linked to the threaded hole 33 and to a source of fluid under pressure (also not represented). Constant braking torque is obtained by controlling the introduction of fluid under pressure of a certain value into the pressure chamber 30 so as to engage or push the movable frame 4 on the friction disk 9.

Disengagement of the movable frame 4 from the disk 9 is obtained by at least one elastic system 34 placed between the frame 4 and the housing 3 so that it will pull back, in the absence of fluid under pressure in chamber 30, the frame 4 towards this housing. More precisely, each spring 34 is set in a bore in the mobile frame 4, parallel to axis X–X', with one of its end coils resting on a screw head 35 anchored in the fixed-support housing 3, and its opposite end coil resting against the wall at the end of the bore, which is pierced to allow the passage of the threaded part of the locking screw 35. The secondary control of the device in FIG. 5 works in the same manner as that of each of the other modes of realization previously described, that is, it provides an additional braking torque proportional to the load carried by the forklift. The braking device in FIG. 5 may include security devices identical to those described with reference to FIG. 3.

Of course, several modifications may be made to the braking device without leaving the framework of the present invention. Thus, particular types of main control other than electromagnetic, pneumatic, or hydraulic may be envisaged, for example, mechanical types of main control. In addition, it is possible to foresee multidisk braking devices instead of the single-disk braking device described in the preceding modes of realization. In these modes of realization, the devices are equipped with friction linings on rotating disks joined to braking shafts, however, it is understood that the device may be arranged so that the friction material is joined to a fixed part of the brake.

What is claimed is:

1. A moving-system braking device, comprising:

main control means for exerting a moving-system constant braking force on a pad having at least one friction lining; and secondary control means for exerting an additional moving-system braking force on said pad, and which can be added to said constant braking force, wherein said additional braking force is a function of a variable control parameter;

wherein said main control means includes a frame parallel to said pad and movable along an axis of a fixed-support housing, said frame being non-rotatable relative to said housing, whereby an axial displacement of said frame between a position of disengagement from said pad and a position of engagement with said pad results in said constant braking force, and wherein said secondary control means includes a first piston system housed in said fixed-support housing, said first piston system axially movable within said fixed-support housing to engage said frame and exert said additional braking force which adds to said constant braking force, and wherein said main control means includes at least one elastic system placed between said frame and said fixed-support housing to thereby move said frame into said position of engagement with said pad and produce said constant braking force on said pad; and, an annular electromagnet housed in said fixed-support housing, wherein said electromagnet counteracts a force of said elastic system and moves said frame to said position of disengagement from said pad when said electromagnet is fed with an electrical current.

2. The device according to claim 1, wherein said additional braking force varies in proportion to said variable control parameter.

3. The device according to claim 1 wherein said secondary control means includes a pressure chamber built into said fixed-support housing, said pressure chamber connected to a bore in said housing and to a secondary command circuit that allows the introduction into said pressure chamber of a fluid under variable pressure to thereby push said first piston system against said frame with a force proportional to a pressure within said pressure chamber.

4. The device according to claim 1 wherein said pad is a rotary disk mounted on a brake shaft kinematically linked to a wheel of a vehicle and wherein friction linings are located on both sides of said pad.

5. A moving-system braking device, comprising:

main control means for exerting a moving-system constant braking force on a pad having at least one friction lining; and secondary control means for exerting an additional moving-system braking force on said pad, wherein said additional braking force is a function of a variable control parameter;

wherein said main control means includes a frame parallel to said pad and movable along an axis of a fixed-support housing, said frame being non-rotatable relative to said housing, whereby an axial displacement of said frame between a position of disengagement from said pad and a position of engagement with said pad results in said constant braking force, and wherein said secondary control means includes a first piston system housed in said fixed-support housing, said first piston system axially movable within said fixed-support housing to engage said frame and exert said additional braking force, and wherein said main control means includes at least one elastic system placed between said frame and said fixed-support housing to thereby move said frame into said position of engagement with said pad and produce said constant braking force on said pad; and, an annular electromagnet housed in said fixed-support housing, wherein said electromagnet counteracts a force of said elastic system and moves said frame to said position of disengagement from said pad when said electromagnet is fed with an electrical current.

6. The device according to claim 5, wherein said additional braking force varies in proportion to said variable control parameter.

7. The device according to claim 5 wherein said secondary control means includes a pressure chamber built into said fixed-support housing, said pressure chamber connected to a bore in said housing and to a secondary command circuit that allows the introduction into said pressure chamber of a fluid under variable pressure to thereby push said piston system against said frame with a force proportional to a pressure within said pressure chamber.

8. The device according to claim 5 wherein said pad is a rotary disk mounted on a brake shaft kinematically linked to a wheel of a vehicle and wherein friction linings are located on both sides of said pad.

9. A forklift, comprising:

main control means for exerting a moving-system constant braking force on a pad having at least one friction lining;

secondary control means for exerting an additional moving-system braking force on said pad, wherein said additional braking force is a function of a variable control parameter;

a hydraulic load fork control circuit connected to said secondary control means; and, at least one load fork wherein said variable control parameter comprises an oil pressure control from said hydraulic load fork control circuit, said oil pressure control varying responsive to a load carried by said at least one load fork.

10. The forklift of claim 9, wherein said constant braking force corresponds to an absence of said load from said at least one load fork.

* * * * *

UNITED STATES PATENT AND TRADEMARK OFFICE
CERTIFICATE OF CORRECTION

PATENT NO. : 6,129,184
DATED : October 10, 2000
INVENTOR(S) : Ferrand et al.

It is certified that error appears in the above-identified patent and that said Letters Patent is hereby corrected as shown below:

On the first page,

After the heading "Assignee:" delete "Dana Corporation, Toledo, Ohio" and substitute "Warner France, Allones, France" therefor.

Signed and Sealed this

Seventeenth Day of July, 2001

*Attest:*

NICHOLAS P. GODICI
*Attesting Officer*  Acting Director of the United States Patent and Trademark Office

UNITED STATES PATENT AND TRADEMARK OFFICE
CERTIFICATE OF CORRECTION

PATENT NO. : 6,129,184
DATED : October 10, 2000
INVENTOR(S) : Ferrand et al.

It is certified that error appears in the above-identified patent and that said Letters Patent is hereby corrected as shown below:

<u>Title page,</u>
Item [30], please insert

-- Foreign Application Priority Data
October 25, 1996 [FR] France ............96 13 072 --

Signed and Sealed this

Thirtieth Day of October, 2001

Attest:

*Attesting Officer*

NICHOLAS P. GODICI
*Acting Director of the United States Patent and Trademark Office*